US012615074B2

(12) United States Patent
Sarrigeorgidis et al.

(10) Patent No.: US 12,615,074 B2
(45) Date of Patent: Apr. 28, 2026

(54) DUAL PORT SSB FOR MULTI-Rx BEAM SELECTION

(71) Applicant: Apple Inc., Cupertino, CA (US)

(72) Inventors: Konstantinos Sarrigeorgidis, Los Gatos, CA (US); Manasa Raghavan, Sunnyvale, CA (US); Yang Tang, San Jose, CA (US); Franz J Eder, Neubiberg (DE); Andre Janssen, Meunchen (DE); Xiang Chen, Campbell, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 18/613,844

(22) Filed: Mar. 22, 2024

(65) Prior Publication Data

US 2024/0380449 A1 Nov. 14, 2024

Related U.S. Application Data

(60) Provisional application No. 63/501,818, filed on May 12, 2023.

(51) Int. Cl.
*H04B 7/0456* (2017.01)
*H04B 7/0408* (2017.01)

(52) U.S. Cl.
CPC ......... *H04B 7/0456* (2013.01); *H04B 7/0408* (2013.01)

(58) Field of Classification Search
CPC ...... H04B 10/532; H04B 14/008; H04B 7/10;

H04B 7/0469; H04B 7/0456; H04B 7/0408; H04B 7/024; H04B 7/0802; H04B 7/0695; H04B 7/088; H04B 7/0413; H04B 7/026; H04B 7/022; H04W 36/00692

See application file for complete search history.

(56) References Cited

U.S. PATENT DOCUMENTS

| | | | | |
|---|---|---|---|---|
| 11,622,338 B2 * | 4/2023 | Nilsson | ............... | H04L 27/2655 370/350 |
| 2022/0247455 A1 * | 8/2022 | Raghavan | ............ | H04B 7/0695 |
| 2023/0088488 A1 * | 3/2023 | Venugopal | .......... | H04W 72/044 370/329 |

(Continued)

OTHER PUBLICATIONS

Assessing a MIMO Channel White Paper; Rohde & Schwarz Assessing a MIMO; Feb. 2011.

(Continued)

*Primary Examiner* — Sophia Vlahos

(74) *Attorney, Agent, or Firm* — Eschweiler & Potashnik, LLC

(57) ABSTRACT

Techniques described herein include solutions for utilizing dual port synchronization signal block (SSB) transmissions for multiple receive (Rx) beam selection. In some aspects, a base station transmits a first SSB with a first polarization on a first antenna port, and transmits a second SSB with a second polarization on a second antenna port. The first and second SSBs may be transmitted, for example, using a first transmission reception point (TRP). A user equipment (UE) receives the first and second SSBs, and identifies one or more optimal Rx beams for multiple-input multiple-output (MIMO) communication based on the first and second SSBs.

20 Claims, 8 Drawing Sheets

(56)　　　　　References Cited

U.S. PATENT DOCUMENTS

2023/0261825 A1 *　8/2023　Wang ................... H04L 5/0048
　　　　　　　　　　　　　　　　　　370/336
2023/0413200 A1 *　12/2023　Nilsson ................ H04W 16/28
2024/0080831 A1 *　3/2024　Zhu ................... H04B 7/06952

OTHER PUBLICATIONS

Precoding techniques—ITN Spotlight; https://itnspotlight.com/
precoding-techniques/; May 4, 2023.
Qualcomm Incorporated; "Revised WID: Requirement for NR
frequency range 2 (FR2) multi-Rx chain DL reception"; 3GPP TSG
RAN Meeting #96; RP-221753; Jun. 6, 2022.

* cited by examiner

1. TRANSMIT FIRST AND SECOND SSBS WITH RESPECTIVE FIRST AND POLARIZATIONS USING A FIRST TRP

2. IDENTIFY ONE OR MORE OPTIMAL RX BEAMS BASED ON THE FIRST AND SECOND SSBS

BASE STATION 111

TRP1 150

AP1 132

AP2 134

SSB1 122

SSB2 124

UE 101

142

144

POLARIZATION 1

POLARIZATION 2

RECEIVE, FROM A FIRST TRP, A FIRST SSB WITH A FIRST POLARIZATION AND A SECOND SSB WITH A SECOND POLARIZATION DIFFERENT THAN THE FIRST POLARIZATION — 710

IDENTIFY ONE OR MORE OPTIMAL RX BEAMS FOR MIMO COMMUNICATION BASED ON THE FIRST SSB AND THE SECOND SSB — 720

RECEIVE DATA USING THE ONE OR MORE OPTIMAL RX BEAMS — 730

DUAL PORT SSB FOR MULTI-Rx BEAM SELECTION

REFERENCE TO RELATED APPLICATIONS

This application claims the benefit of U.S. Provisional Application No. 63/501,818, filed on May 12, 2023, the contents of which are hereby incorporated by reference in their entirety

FIELD

This disclosure relates to wireless communication networks including techniques for utilizing beamforming within wireless networks.

BACKGROUND

Wireless communication networks may include user equipments (UEs), base stations, and/or other types of wireless devices capable of communicating with one another. Within a wireless network, a base station and a UE may communicate using multiple-input multiple-output (MIMO), which utilizes multiple antennas for simultaneous transmission/reception in order to improve communication reliability and throughput.

BRIEF DESCRIPTION OF THE DRAWINGS

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

DETAILED DESCRIPTION

Figure 1:
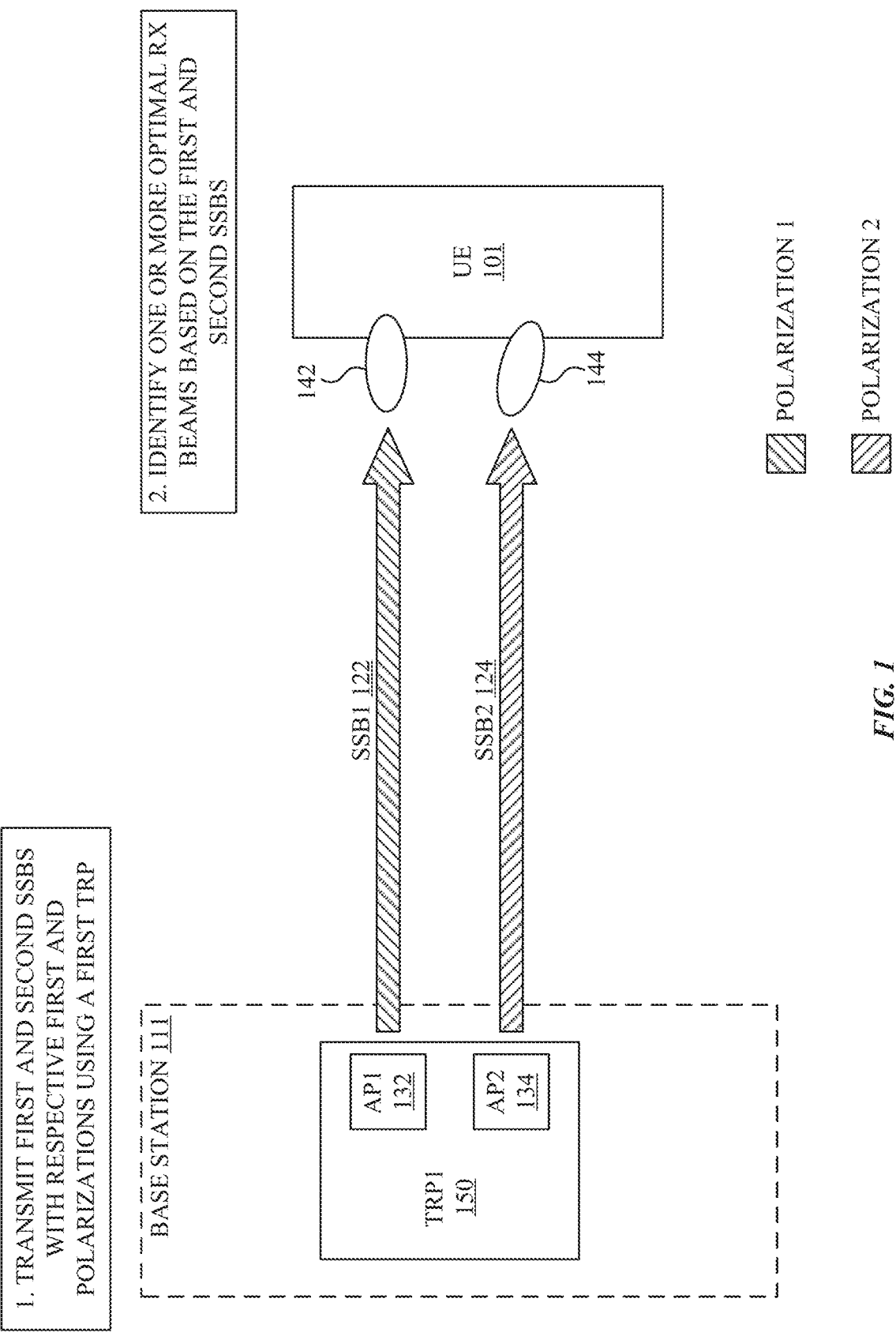
FIG. 1 is a block diagram illustrating a dual port synchronization signal block (SSB) configuration for multiple receive (Rx) beam selection in accordance with some aspects of the present disclosure.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

A user equipment (UE) and a base station may communicate using multiple-input multiple-output (MIMO) by utilizing multiple antennas for data transmission and/or data reception. The multiple antennas are used for transmitting/receiving multiple data streams that share time and/or frequency resources. The use of multiple data streams increases data throughput, and also provides redundancy in the event that one of the data streams becomes unusable (e.g., due to poor signal quality).

In the example of downlink (DL), a base station may, using multiple antennas, simultaneously transmit a plurality of data streams sharing time frequency resources to a UE. Since the plurality of data streams are not separated in time and frequency, the UE utilizes signal diversity to distinguish between the data streams. The signal diversity could be created in the form of spatial diversity by transmitting the data streams from different spatial locations (e.g., transmission reception points (TRPs)), or in the form polarization diversity by transmitting the data streams with different polarizations (e.g., using cross polarized antenna elements). When communicating using MIMO, one or more of the above techniques may be used. For example, spatial diversity may be used alone (e.g., spatial MIMO), polarization diversity may be used alone (e.g., polarization MIMO), or spatial diversity and polarization diversity may be used in combination (e.g., spatial and polarization MIMO).

The UE may receive the plurality of data streams using multiple antennas. In order to ensure accurate data reception, it is important that each data stream of the plurality of data streams is received with sufficient signal strength. One technique for increasing signal strength is receive (Rx) beamforming, which allows the UE to selectively receive signals from certain direction(s). The UE may utilize one or more Rx beams for receiving the plurality of data streams from the base station. In some scenarios, Rx beamforming at the UE side is used in combination with transmit (Tx) beamforming at the base station side to further increase signal strength. In order to ensure good performance across all data streams, the UE may select the one or more Rx beams in a manner that optimizes signal strength across all of the data streams. The one or more Rx beams may be selected, for example, based on reference signals associated with (e.g., quasi co-located with) the plurality of data streams. One type of reference signal that may be used for Rx beam selection is synchronization signal block (SSB).

The current 3rd Generation Partnership Project (3GPP) specification only supports SSB transmission at the base station side using a single antenna port per TRP. When considering techniques such as polarization MIMO, it is possible that two data streams with differing polarizations may be transmitted from a single TRP. In such scenarios, Rx beam selection may be performed by the UE based on single port SSB transmissions. However, this ignores the different transmission characteristics for different polarizations, which results in reduced Rx beam selection accuracy. Accordingly, in order to achieve more accurate Rx beam selection when utilizing polarization MIMO, the present disclosure relates to utilizing dual port SSB for multiple Rx beam selection. In some aspects, the base station is configured to transmit a first SSB with a first polarization on a first antenna port and a second SSB with a second polarization on a second antenna port, the second polarization being different than the first polarization. The UE may determine one or more optimal Rx beams based on the first and second SSBs.

FIG. 1 illustrates an example dual port SSB configuration for multiple Rx beam selection in accordance with some aspects of the present disclosure. A base station 111 is configured with a first antenna port 132 and a second antenna port 134. The base station 111 is configured to transmit first and second SSBs 122, 124 on the first and second antenna ports 132, 134 respectively. In some aspects, the first and second SSBs 122, 124 are transmitted by the base station 111 using a first TRP 150.

The first SSB 122 is transmitted with a first polarization, and the second SSB 124 is transmitted with a second polarization that is different than the first polarization. In some aspects, a plurality of cross polarized antenna elements are used to transmit the SSBs 122, 124. The cross polarized antenna elements may include, for example, orthogonally polarized antenna elements such as vertically polarized antenna elements and horizontally polarized antenna elements. The vertically and horizontally polarized antenna elements are used to transmit signals with different polarizations (e.g., the first and second polarizations). The cross polarized antenna elements may be part of, for example, an antenna panel.

The first and second SSBs 122, 124 are received by a UE 101, which identifies one or more "optimal" or "best" Rx beams based on the first and second SSBs 122, 124. In the illustrated example, the UE 101 identifies the beam 142 and the beam 144 as the one or more optimal Rx beams. The UE 101 may identify the one or more optimal Rx beams based on measurements performed on the first and second SSBs 122, 124. The measurements may include, for example, reference signal received power (RSRP) measurements, reference signal received quality (RSRQ) measurements, signal to interference and noise ratio (SINR) measurements, or another suitable type of measurement.

Figure 2:
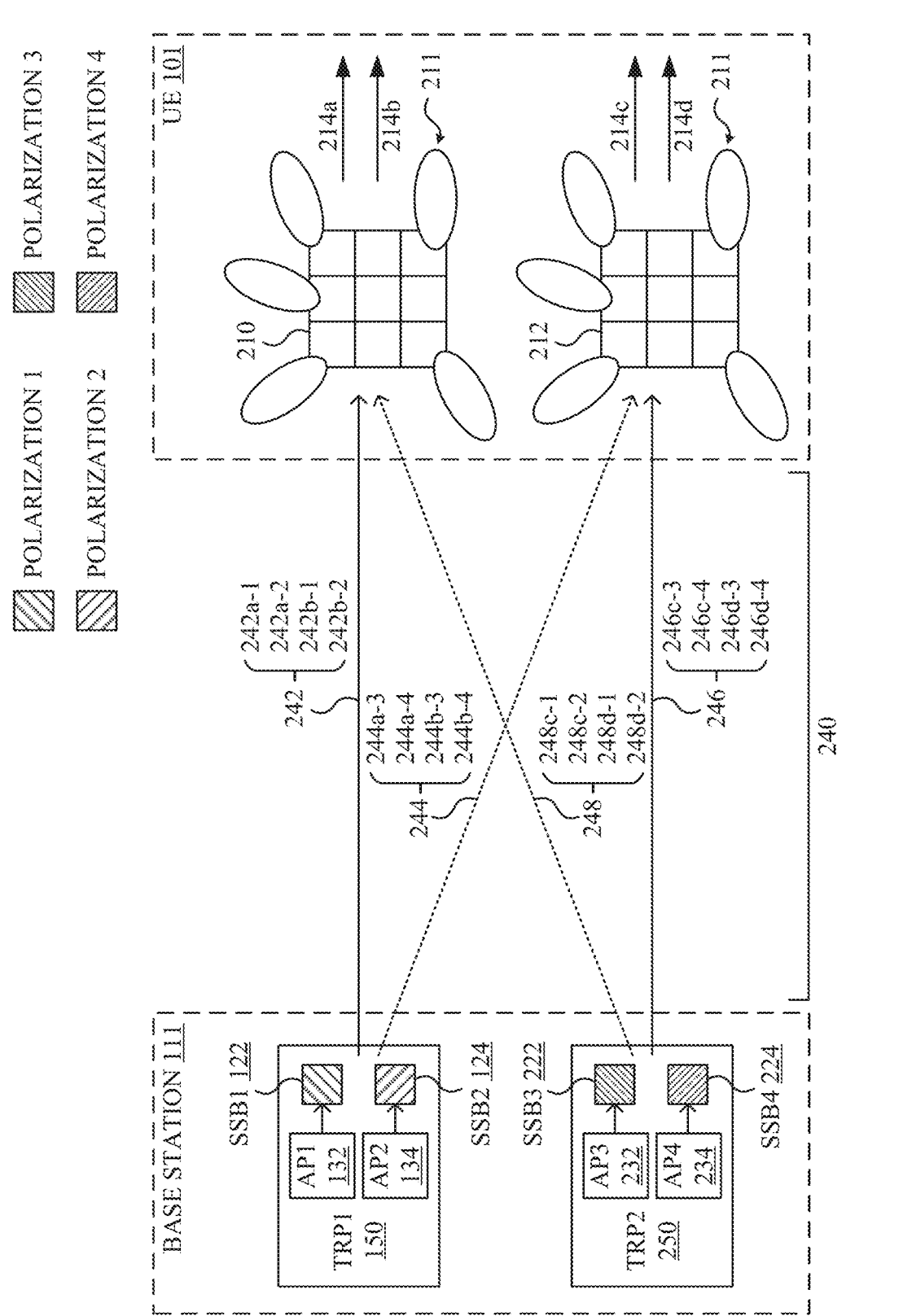
FIG. 2 is a schematic diagram illustrating a dual port SSB configuration for a first TRP and a second TRP for multiple Rx beam selection in accordance with some aspects of the present disclosure.

FIG. 2 illustrates an example dual port SSB configuration for a first TRP 150 and a second TRP 250 for multiple Rx beam selection in accordance with some aspects of the present disclosure. A base station 111 is configured with a first antenna port 132, a second antenna port 134, a third antenna port 232, and a fourth antenna port 234. The base station 111 is configured to transmit a first SSB 122, a second SSB 124, a third SSB 222, and a fourth SSB 224 using the first, second, third, and fourth antenna ports 132, 134, 232, 234 respectively.

The first SSB 122 is transmitted with a first polarization, and the second SSB 124 is transmitted with a second polarization that is different than the first polarization. The first and second SSBs 122, 124 may be transmitted, for example, using a first set of cross polarized antenna elements (e.g., orthogonally polarized antenna elements). The first and second SSBs may be transmitted using the first TRP 150.

The third SSB 222 is transmitted with a third polarization, and the fourth SSB 224 is transmitted with a fourth polarization that is different than the third polarization. The third and fourth SSBs 222, 224 may be transmitted, for example, using a second set of cross polarized antenna elements (e.g., orthogonally polarized antenna elements). The third and fourth SSBs 222, 224 may be transmitted using the second TRP 250.

In some aspects, the first, second, third, and fourth SSBs 122, 124, 222, 224 are transmitted using different time and/or frequency resources. For example, the SSBs 122, 124, 222, 224 may be transmitted using a same set of frequency resources and different sets of time resources. The SSBs 122, 124, 222, 224 may be received by a UE 101 using a first antenna panel 210 and a second antenna panel 212 of the UE 101.

In some aspects, the SSBs 122, 124, 222, 224 are transmitted across an air interface 240. When traveling across the air interface 240, each of the SSBs 122, 124, 222, 224 may follow one or more propagation paths, such as paths 242, 244, 246, and 248. For example, the first and second SSBs 122, 124 may propagate along the path 242 and the path 244. The path 242 extends from the first TRP 150 to the first antenna panel 210, and the path 244 extends from the first TRP 150 to the second antenna panel 212. The third and fourth SSBs 222, 224 may propagate along the path 246 and the path 248. The path 246 extends from the second TRP 250 to the second antenna panel 212, and the path 248 extends from the second TRP 250 to the first antenna panel 210.

While the paths 242, 244, 246, and 248 are illustrated for simplicity, it is appreciated that each of the paths may in reality represent one or more paths. In other words, although the SSBs 122, 124 are illustrated as propagating along the paths 242, 244, the SSB 122 and the SSB 124 may propagate along slightly different paths due to being transmitted or received by different antenna elements, etc. In some aspects, the antenna panel 210 comprises a first antenna array and a second antenna array, and the antenna panel 212 comprises a third antenna array and a fourth antenna array, which are used for receiving the SSBs 122, 124, 222, 224. The first and third antenna arrays may be vertically polarized antenna arrays, and the second and fourth antenna arrays may be horizontally polarized antenna arrays. In some examples, the first SSB 122 propagates along paths 242a-1, 242a-2, 244a-3, and 244a-4 that extend from the first TRP 150 (e.g., transmitted on the first antenna port 132) to first, second, third, and fourth antenna arrays respectively. The second SSB 124 may propagate along paths 242b-1, 242b-2, 244b-3, and 244b-4 that extend from the first TRP 150 (e.g., transmitted on the second antenna port 134) to the first, second, third, and fourth antenna arrays respectively. The third SSB 222 may propagate along paths 248c-1, 248c-2, 246c-3, and 246c-4 that extend from the second TRP 250 (e.g. transmitted on the third antenna port 232) to the first, second, third, and fourth antenna arrays respectively. The fourth SSB 224 may propagate along paths 248d-1, 248d-2, 246d-3, and 246d-4 that extend from the second TRP 250 (e.g., transmitted on the fourth antenna port 234) to the first, second, third, and fourth antenna arrays respectively. Signals propagating along each of the paths may experience slightly different noise, interference, etc. due to be transmitted and/or received by different antenna elements that differ in polarization and/or spatial location.

Signals transmitted across the air interface 240 undergo a transformation that is modeled by a channel matrix H. A number of rows of the channel matrix corresponds to a number of outputs, and a number of columns of the channel matrix corresponds to a number of inputs. In the illustrated example, the UE 101 and the base station 111 are configured to communicate using 4×4 MIMO, in other words, using four inputs (e.g., four streams for data transmission) and four outputs (e.g., four streams for data reception). The base station 111 is configured to transmit using two antenna ports with different polarizations per each of the two TRPs (e.g., polarization and spatial MIMO), resulting in a total of four inputs. The UE 101 is configured to receive using two polarizations across two antenna panels, resulting in four outputs.

In illustrated example (e.g., 4×4 MIMO), the channel transformation across the air interface 240 can be modeled by a first channel matrix:

$$H = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix}$$

The channel matrix H comprises a plurality of channel coefficients $h_{x,y}$ that model the channel transformation between an input y and an output x. In the example of 4×4 MIMO, the value of y varies from 1-4 and the value of x varies from 1-4. The inputs y may correspond to the antenna ports 132, 134, 232, 234 of the base station 111, and the outputs x may correspond to the first, second, third, and fourth antenna arrays of the UE 101. In some examples, each of the channel coefficients in the channel matrix H is associated with one of the propagation paths (e.g., sub-paths of 242, 244, 246, 248, as previously described).

The channel matrix H defines the relationship between a transmitted signal s (e.g., transmitted by the base station 111), a received signal y (e.g., received by the UE 101), and noise on the channel n according to equation 1:

$$\begin{bmatrix} y_1 \\ y_2 \\ y_3 \\ y_4 \end{bmatrix} = H \begin{bmatrix} s_1 \\ s_2 \\ s_3 \\ s_4 \end{bmatrix} + \begin{bmatrix} n_1 \\ n_2 \\ n_3 \\ n_4 \end{bmatrix}$$

The UE 101 may utilize measurements of SSBs 122, 124, 222, 224 to estimate the channel matrix H according to equation 1. Since SSB is a reference signal, the transmitted signal s is known by the UE 101. Based on the measurements of the SSBs, the UE may determine the received signal y. Using the received signal y and the transmitted signal s, the UE 101 may estimate the channel matrix H. In some examples, the UE 101 uses a channel estimation algorithm to estimate the channel matrix H. The channel estimation algorithm may involve using a channel estimation filter to optimally combine the signal y to optimize signal to noise ratio (SNR).

Once the channel matrix H has been estimated, the UE 101 may receive data transmissions from the base station 111. Using the estimated channel matrix H and the received signal y, the UE 101 may calculate the transmitted signal s to decode the data transmissions.

The UE 101 may be configured with one or more Rx beams and utilize RX beamforming. For example, in 4×4 MIMO, the UE 101 may utilize 4 Rx beams $b_1$, $b_2$, $b_3$, $b_4$, where each beam is associated with one or more antennas. In some examples, the beams $b_1$, $b_2$, $b_3$, $b_4$ are associated with the first, second, third, and fourth antenna arrays respectively.

Utilizing different Rx beams may affect the gain experienced across the channel. As a result, the values of the channel coefficients $h_{x,y}$ of the channel matrix H may vary depending on the Rx beams $b_1$, $b_2$, $b_3$, $b_4$ the UE is configured with. When taking Rx beamforming into account, a second channel matrix may be expressed as a function of the Rx beams $b_1$, $b_2$, $b_3$, $b_4$:

$$H(b_1, b_2, b_3, b_4)_k = \begin{bmatrix} h_{1,1}[b_1] & h_{1,2}[b_1] & h_{1,3}[b_1] & h_{1,4}[b_1] \\ h_{2,1}[b_2] & h_{2,2}[b_2] & h_{2,3}[b_2] & h_{2,4}[b_2] \\ h_{3,1}[b_3] & h_{3,2}[b_3] & h_{3,3}[b_3] & h_{3,4}[b_3] \\ h_{4,1}[b_4] & h_{4,2}[b_4] & h_{4,3}[b_4] & h_{4,4}[b_4] \end{bmatrix}_k$$

As seen in the second channel matrix, the channel coefficients $h_{1,1}$, $h_{1,2}$, $h_{1,3}$, $h_{1,4}$ depend upon the beam $b_1$. In other words, signals transmitted on the antenna ports 132, 134, 232, 234 will be received differently by the beam $b_1$ (e.g. with different amplitude and/or phase) depending on how the beam $b_1$ is configured (e.g., a direction of the beam $b_1$), which will lead to different estimated values of the channel coefficients $h_{1,1}$, $h_{1,2}$, $h_{1,3}$, $h_{1,4}$. Similar logic applies to the beams $b_2$, $b_3$, and $b_4$.

In some aspects, the beams $b_1$, $b_2$, $b_3$, $b_4$ are each selected from a beam codebook 211 having a total of m number of entries. The UE 101 may measure each of the SSBs 122, 124, 222, 224 using each of the beam entries in the beam codebook 211 in order to estimate all possible channel coefficients. For example, the UE 101 may receive m occasions of the first SSB 122, where each occasion is used to "test" a different beam in the beam codebook 211. In other words, a different Rx beam from the beam codebook 211 is used to receive the first SSB 122 during each occasion. The UE 101 may simultaneously "test" beams entries from the beam codebook 211 as values for beams $b_1$, $b_2$, $b_3$, $b_4$ and estimate the channel coefficients $h_{1,1}$, $h_{2,1}$, $h_{3,1}$, $h_{4,1}$ accordingly. The process may be repeated for the SSBs 124, 222, 224. For example, the UE 101 receives m occasions of the second SSB 124 in order to estimate $h_{1,2}$, $h_{2,2}$, $h_{3,2}$, $h_{4,2}$, m occasions of the third SSB 222 in order to estimate $h_{1,3}$, $h_{2,3}$, $h_{3,3}$, $h_{4,3}$, and m occasions of the fourth SSB 224 in order to estimate $h_{1,4}$, $h_{2,4}$, $h_{3,4}$, $h_{4,4}$. This results in a total of 4m number of SSB transmissions when considering the SSBs 122, 124, 222, 224.

In some aspects, the channel matrix H further depends on the frequency tone k used for transmission. For example, each of the SSBs 122, 124, 222, 224 may be transmitted with K number of frequency tones, and the channel matrix H may be estimated for each value of k in the K number of frequency tones.

In some aspects, upon reception of the SSBs 122, 124, 222, 224, a minimum mean square error (MMSE) equalizer is applied (e.g., using digital signal processing). When applying the MMSE equalizer, an equalized signal z may be produced according equation 2:

$$\begin{bmatrix} z_1 \\ z_2 \\ z_3 \\ z_4 \end{bmatrix} = W_{mmse}(b_1, b_2, b_3, b_4) = \left( H(b_1, b_2, b_3, b_4) * H(b_1, b_2, b_3, b_4) + \frac{1}{snr} I \right)^{-1} H(b_1, b_2, b_3, b_4) *$$

In equation 2, I represents the identity matrix. In the example of 4×4 MIMO, both H and I may be 4×4 matrices. The SNR of equation 2 may be measured by the UE 101. In some examples, the UE 101 measures the SNR of multiple SSBs (e.g., SSBs 122, 124, 222, 224) over time, and keeps a running average of the SSB SNR, which is used in equation 2.

After applying the MMSE equalizer according to equation 2, the sub-stream SINR can be calculated using equation 3:

$$\rho_n(b_1, b_2, b_3, b_4) = \frac{snr}{\left[\left[\left(H(b_1, b_2, b_3, b_4) * H(b_1, b_2, b_3, b_4) + \frac{1}{snr}I\right)^{-1}\right]\right]_n} - 1$$

Each sub-stream SINR, for example, may be associated with one of the propagation paths $242a$-1, $242a$-2, $242b$-1, $242b$-2, $244a$-3, $244a$-4, $244b$-3, $244b$-4, $248c$-1, $248c$-2, $248d$-1, $248d$-2, $246c$-3, $246c$-4, $246d$-3, $246d$-4, and correspond to one of the channel coefficients in the channel matrix H. In the example of 4×4 MIMO, possible values of n in equation 3 may be n=1, 2, 3, 4.

From equation 3, the MMSE capacity can be calculated using equation 4:

$$C_{mmse} = \sum_{k=1}^{K} \sum_{n=1}^{n=4} \log_2 \left( \frac{snr}{\left[\left[\left(H(b_1, b_2, b_3, b_4)_k * H(b_1, b_2, b_3, b_4)_k + \frac{1}{snr}I\right)^{-1}\right]\right]_n} \right)$$

An optimal beam combination $b_1^*$, $b_2^*$, $b_3^*$, $b_4^*$ can be found by searching for the maximum value of equation 4 for all beam combinations $b_1$, $b_2$, $b_3$, $b_4$ and frequency tones k, according to equation 5:

$$b_1^*, b_2^*, b_3^*, b_4^*] = \underset{b_1 \in \Phi, b_2 \in \Phi, b_3 \in \Phi, b_4 \in \Phi}{\arg\max}$$

$$\sum_{k=1}^{K} \sum_{n=1}^{n=4} \log_2 \left( \frac{snr}{\left[\left[\left(H(b_1, b_2, b_3, b_4)_k * H(b_1, b_2, b_3, b_4)_k + \frac{1}{snr}I\right]\right]_n} \right)$$

In equation 5, Φ represents the m number of beams in the beam codebook 211. The calculation of the optimal combination of beams $b_1^*$, $b_2^*$, $b_3^*$, $b_4^*$ relies on knowledge of the channel, by the channel matrix H, when different beams from the beam codebook 211 are used as $b_1$, $b_2$, $b_3$, $b_4$. Thus, the optimal combination of beams $b_1^*$, $b_2^*$, $b_3^*$, $b_4^*$ is calculated by the UE 101 after the channel coefficients have been estimated for all possible beams in the beam codebook 211 and all possibly frequency tones. The channel coefficients are estimated, for example, based on the SSBs 122, 124, 222, 224 as previously described.

Once the UE 101 identifies the one or more optimal Rx beams $b_1^*$, $b_2^*$, $b_3^*$, $b_4^*$, the UE may utilize the one or more optimal Rx beams to receive data from the base station 111. In the example of 4×4 MIMO, the one or more optimal Rx beams $b_1^*$, $b_2^*$, $b_3^*$, $b_4^*$ may be associated with the first, second, third, and fourth antenna arrays respectively. Based on the signal y received from the base station 111 and the value of channel matrix H for the beams $b_1^*$, $b_2$, $b_3^*$, $b_4^*$, and the frequency tone k, the UE 101 may derive the original signal s (e.g., according to equation 1) to decode four corresponding data streams $214a$, $214b$, $214c$, $214d$.

In some aspects, the size of the beam codebook 211 is selected based on application needs. For example, a beam codebook with more beam entries will allow for more precise beam selection. In contrast, a beam codebook with fewer beam entries reduces calculation complexity.

Figure 3:
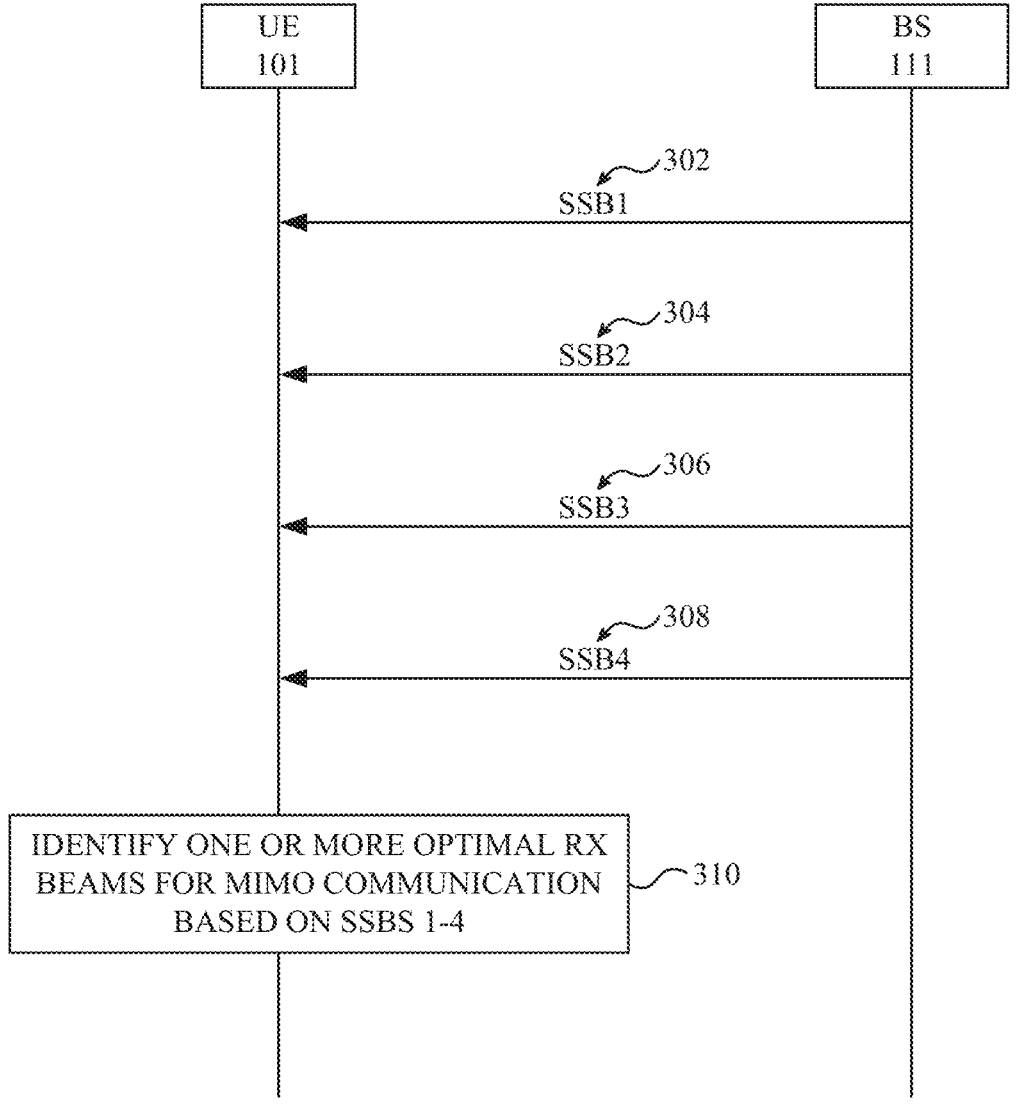
FIG. 3 is a schematic diagram illustrating signaling between a user equipment (UE) and a base station using dual port SSB transmission for identifying one or more optimal Rx beams in accordance with some aspects of the present disclosure.

FIG. 3 illustrates an example of signaling exchanged between a UE 101 and a base station 111 using dual port SSB transmission for identifying one or more optimal Rx beams in accordance with some aspects of the present disclosure.

In some aspects, at act 302, the base station 111 transmits one or more occasions of a first SSB (e.g., the first SSB 122)

to the UE 101. The first SSB may be transmitted with a first polarization on a first antenna port. In some examples, the first SSB is transmitted m number of times, where m is the number of beam entries in the beam codebook (e.g., the beam codebook 211), as previously described.

In some aspects, at act 304, the base station 111 transmits one or more occasions of a second SSB (e.g., the second SSB 124) to the UE 101. The second SSB may be transmitted with a second polarization on a second antenna port. In some examples, the second SSB is transmitted m number of times, where m is the number of beam entries in the beam codebook.

In some aspects, at act 306, the base station 111 transmits one or more occasions of a third SSB (e.g., the third SSB 222) to the UE 101. The third SSB may be transmitted with a third polarization on a third antenna port. In some examples, the third SSB is transmitted m number of times, where m is the number of beam entries in the beam codebook.

In some aspects, at act 308, the base station 111 transmits one or more occasions of a fourth SSB (e.g., the fourth SSB 224) to the UE 101. The fourth SSB may be transmitted with a fourth polarization on a fourth antenna port. In some examples, the fourth SSB is transmitted m number of times, where m is the number of beam entries in the beam codebook.

In some aspects, as previously described, the first and second SSBs are transmitted using a first TRP, and the third and fourth SSBs are transmitted using a second TRP. The first and second polarizations may be different from one another, and the third and fourth polarizations may be different from one another.

In some aspects, the first, second, third, and fourth SSBs are transmitted using same frequency resources and different time resources. The first, second, third, and fourth SSBs may be offset in the time domain in order to each facilitate estimation of a certain subset of channel coefficients of the channel matrix H. For example, as previously described, the first SSB may be used to estimate the channel coefficients $h_{1,1}$, $h_{2,1}$, $h_{3,1}$, $h_{4,1}$, the second SSB may be used to estimate the channel coefficients $h_{1,2}$, $h_{2,2}$, $h_{3,2}$, $h_{4,2}$, the third SSB may be used to estimate the channel coefficients $h_{1,3}$, $h_{2,3}$, $h_{3,3}$, $h_{4,3}$, and the fourth SSB may be used to estimate the channel coefficients $h_{1,4}$, $h_{2,4}$, $h_{3,4}$, $h_{4,4}$.

Upon reception of each of the SSBs, the UE 101 may perform one or more measurements to facilitate estimation of the channel matrix H. The measurements may include, for example, RSRP measurements, RSRQ measurements, SINR measurements, or other suitable types of measurements.

In some aspects, at act 310, the UE 101 identifies one or more optimal Rx beams for MIMO communication based on the first, second, third, and fourth SSBs (e.g., based on measurements of the SSBs). In some aspects, the one or more optimal Rx beams are identified according to equation 5, as previously described.

Figure 4:
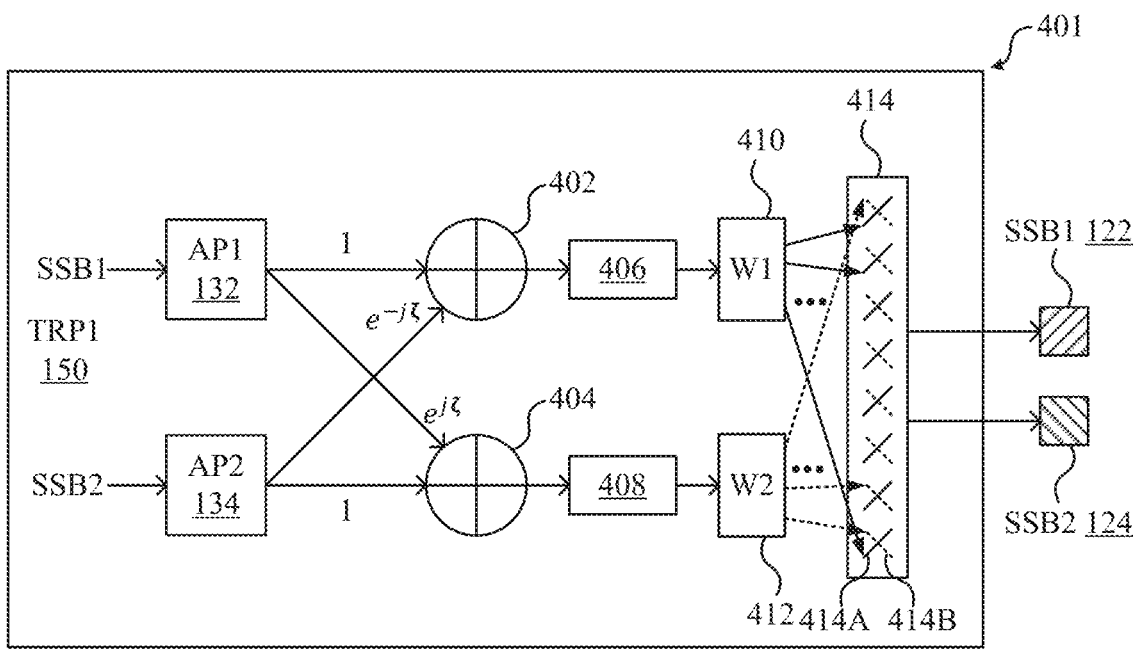
FIG. 4 is a schematic diagram illustrating dual port SSB transmission in accordance with some aspects of the present disclosure.
Figure 4:
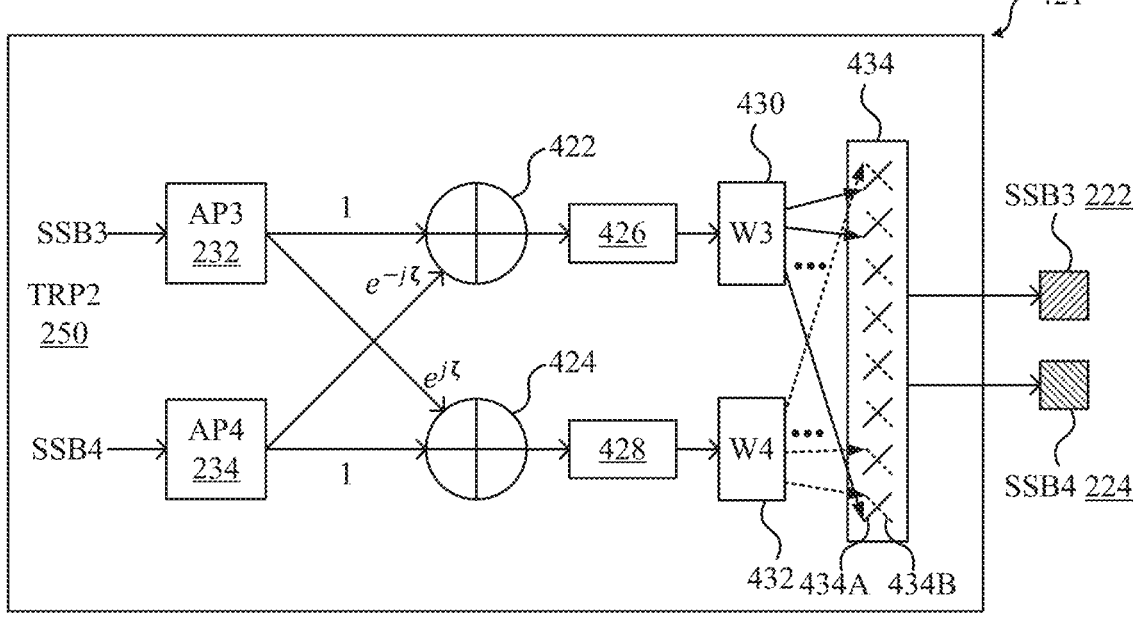

FIG. 4 illustrates an example of dual port SSB transmission in accordance with some aspects of the present disclosure. Similar to FIG. 1, illustrated is a first TRP 150 of a base station (e.g., the base station 111) including a first antenna port 132 and a second antenna port 134.

Further illustrated is a first signal processor 402, a second signal processor 404, a first transmit radio frequency (RF) chain 406, and a second transmit RF chain 408. The first SSB 122 is transmitted using the first antenna port 132. The first SSB is received by the first signal processor 402 and passed to the first transmit RF chain 406. Subsequently, the first SSB is transformed according to a first precoding matrix W1 410 to determine a mapping onto antenna elements 414. The first SSB is also received by the second signal processor 404 and passed to the second transmit RF chain 408. Subsequently, the first SSB is transformed according to the second precoding matrix W2 412 to determine a mapping onto the antenna elements 414 according to the second precoding matrix 412. Once mapped to the antenna elements 414, the first SSB 122 is transmitted across the air interface.

In some aspects, the first precoding matrix 410 and the second precoding matrix 412 are used to determine beamforming used to transmit signals on the first transmit RF chain 406 an the second transmit RF chain 408 respectively. For example, depending on the values of the different elements of the first precoding matrix 410, signals on the first transmit RF chain 406 may be mapped onto each of the antenna elements 414A with different weights (e.g., amplitude and/or phase). The resulting transmission on each of the antenna elements 414A results in a beamformed signal.

The second SSB 124 is transmitted using the second antenna port 134. The second SSB is received by the second signal processor 404 and passed to the second transmit RF chain 408. Subsequently, the second SSB is transformed according to the second precoding matrix 412 to determine a mapping onto the antenna elements 414 according to the second precoding matrix 412. The second SSB is also received by the first signal processor 402 and passed to the first transmit RF chain 406. Subsequently, the second SSB is transformed according to the first precoding matrix 410 to determine a mapping onto the antenna elements 414 according to the first precoding matrix 410. Once mapped to the antenna elements 414, the second SSB is transmitted across the air interface.

In some aspects, a signal on the first antenna port 132 is transformed according to the vector $$u_{1RF} = \begin{bmatrix} w_1 \\ w_2 e^{j\zeta} e^{-j\pi/2} \end{bmatrix},$$

and a signal on the second antenna port 134 is transformed according to the vector $$u_{2RF} = \begin{bmatrix} w_1 e^{-j\zeta} \\ w_2 e^{-j\pi/2} \end{bmatrix}.$$

In some aspects, $u_{1RF}$ and $u_{2RF}$ indicate an effective beamforming of the first and second antenna ports 132, 134 respectively. In some examples, the factor $e^{j\zeta}$ is applied to the first SSB 122 when passing through the second signal processor 404 and the factor $e^{-j\zeta}$ is applied to the second SSB 124 when passing through the first signal processor 402. The value of $\zeta$ can be adjusted in order to control the effective polarization used to transmit the first and second SSBs 122, 124. A factor of 1 is applied to the first SSB 122 when passing through the first signal processor 404, and also applied to the second SSB 124 when passing through the second signal processor 406. In some aspects, the signals are transformed according $u_{1RF}$ and $u_{2RF}$ during a first precoding stage 401, and the equivalent precoder is $$V = \begin{bmatrix} 1 & e^{-j\zeta} \\ e^{j\zeta} & 1 \end{bmatrix}.$$

In some aspects, the antenna elements 414 comprises a first set of antenna elements 414A and a second set of antenna elements 414B. The first and second sets of antenna elements 414A, 414B may be, for example, cross polarized antenna elements. Different RF chains may be mapped onto different sets of antenna elements. For example, signals passing through the first transmit RF chain 406 may be mapped onto the first set of antenna elements 414A according to the first precoding matrix 410, and signals passing through the second transmit RF chain 408 may be mapped onto the second set of antenna elements 414B according to the second precoding matrix 412.

FIG. 4 additionally illustrates a second TRP 250 including a third antenna port 232, a fourth antenna port 234, and antenna elements 434. A second precoding stage 421 includes a third signal processor 422, a fourth signal processor 424, a third transmit RF chain 426, a fourth transmit RF chain 428, a third precoding matrix W3 430, and a fourth precoding matrix W4 432. The antenna elements 434 comprise a third set of antenna elements 434A and a fourth set of antenna elements 434B, which may be, for example, cross polarized antenna elements. The second TRP 250 is understood to function in a similar manner as the TRP 150.

Figure 5:
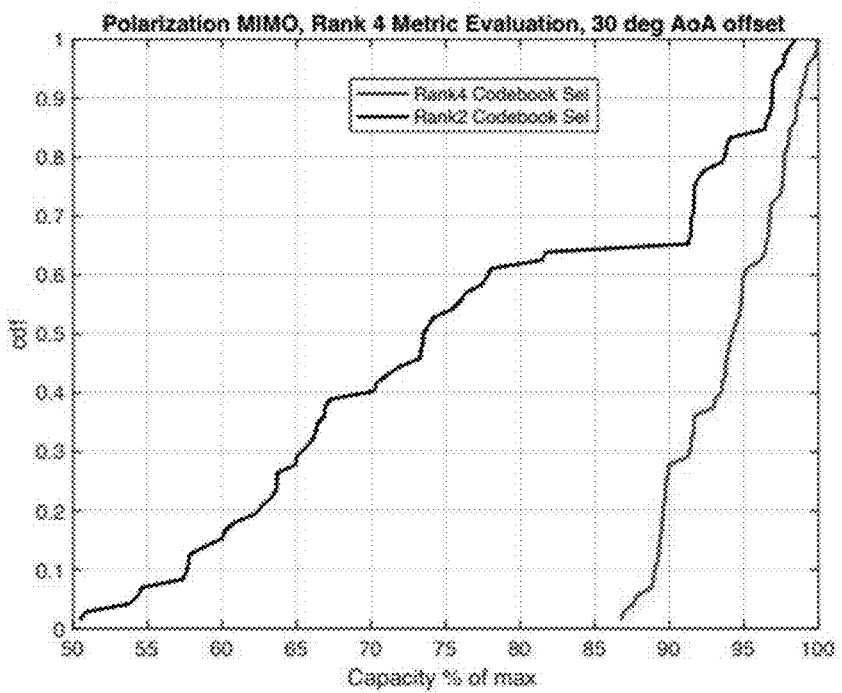
FIGS. 5-6 are waveform diagrams illustrating multiple-input multiple-output (MIMO) performance using Rank 2 and Rank 4 Rx beam selection in accordance with some aspects of the present disclosure.
Figure 6:
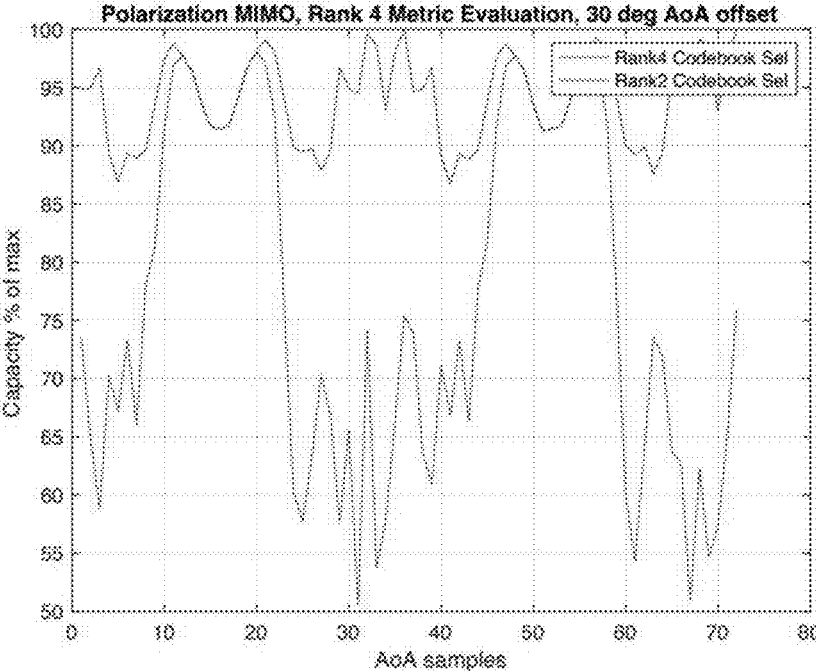

FIGS. 5-6 are waveform diagrams illustrating MIMO performance using Rank 2 and Rank 4 beam selection in accordance with some aspects of the present disclosure. In some examples, Rank 2 beam selection involves using a single SSB port per each TRP for Rx beam selection, and Rank 4 beam selection involves using dual port SSB per each TRP for Rx beam selection. In the example of dual port SSB, each SSB port may be configured to transmit using a different polarization, as previously described. As illustrated in FIGS. 5-6, the Rank 4 codebook selection scenario exhibits improved performance when compared to the Rank 2 codebook selection scenario.

With reference to FIG. 5, The y-axis represents the cumulative distribution function (CDF) value, and the x-axis represents a normalized capacity of the MIMO channel (expressed as percentage of a maximum capacity of the MIMO channel). The capacity may, for example, correspond to $C_{mmse}$ of equation 4. As shown, for a given CDF value, the Rank 4 codebook selection scenario exhibits increased channel capacity when compared to the Rank 2 codebook selection scenario, leading to improved MIMO performance.

With reference to FIG. 6, the y-axis represents a normalized capacity of the MIMO channel, and the x-axis represents angle of arrival (AoA). The angle of arrival may refer to the angle at which signals from the base station (e.g., the base station 111) arrive at the UE (e.g., the UE 101). As shown, the Rank 4 codebook selection scenario exhibits increased channel capacity across a range of AoA values when compared to the Rank 2 codebook selection scenario.

Figure 7:
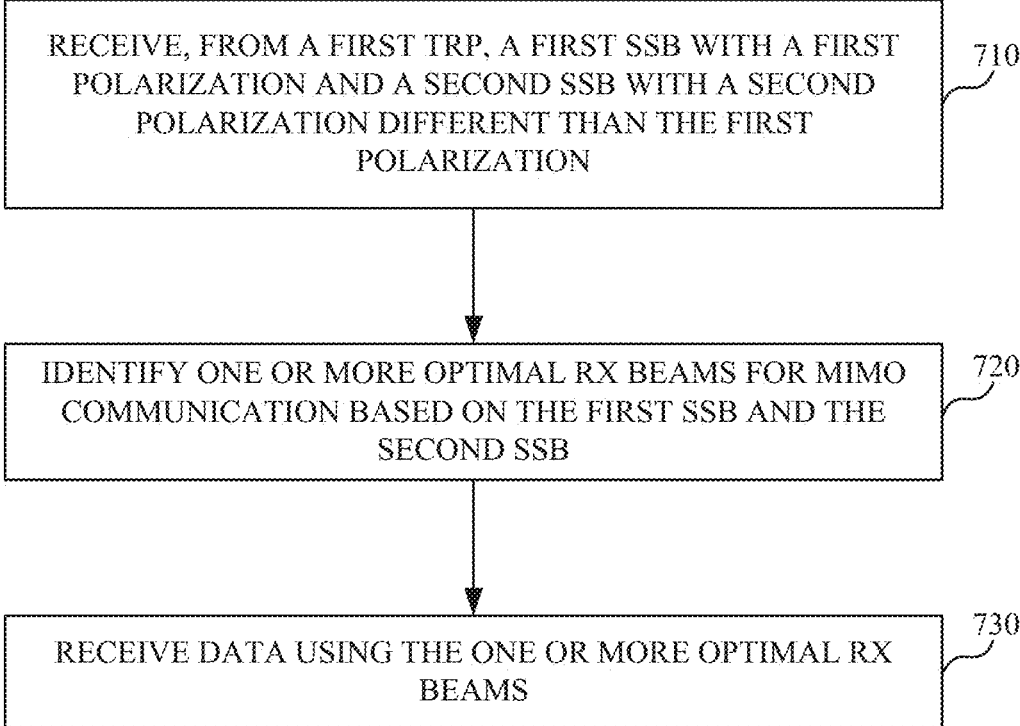
FIG. 7 is a process flow for a UE to determine one or more optimal Rx beams in accordance with some aspects of the present disclosure.

FIG. 7 is a process flow illustrating an example UE (e.g., UE 101) configured to determine one or more optimal Rx beams in accordance with some aspects of the present disclosure.

At act 710, the UE receives, from a first TRP, a first SSB with a first polarization and a second SSB with a second polarization different than the first polarization. The first and second SSBs may be, for example, the first and second SSBs 122, 124 as described throughout the present disclosure.

At act 720, the UE identifies one or more optimal Rx beams for MIMO communication based on the first SSB and the second SSB. The one or more optimal Rx beams may be identified, for example, using equation 5 as described with reference to FIG. 2.

At act 730, the UE receives data (e.g., from a base station) using the one or more optimal Rx beams.

Figure 8:
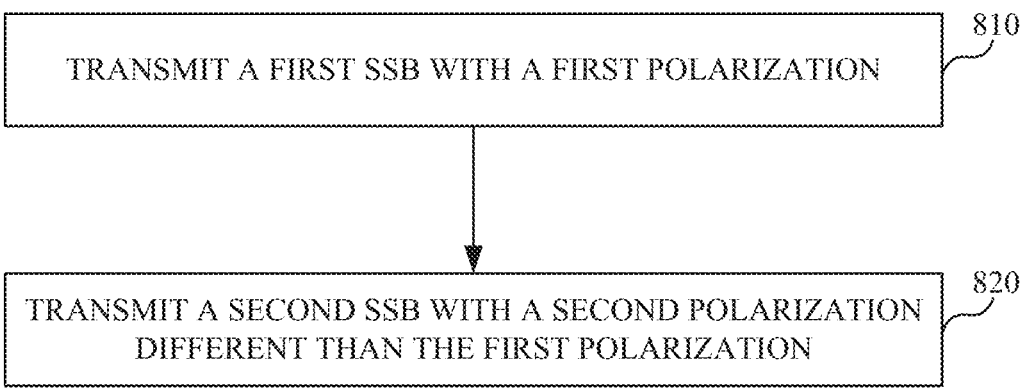
FIG. 8 is a process flow for a base station to transmit SSBs in accordance with some aspects of the present disclosure.

FIG. 8 is a process flow illustrating an example base station (e.g., base station 111) configured to transmit SSBs in accordance with some aspects of the present disclosure.

At act 810, the base station transmits a first SSB with a first polarization.

At act 820, the base station transmits a second SSB with a second polarization different than the first polarization.

The first and second SSBs may be the first and second SSBs 122, 124 as described throughout the present disclosure. In some aspects, the first SSB is transmitted on a first antenna port using a first TRP, and the second SSB is transmitted on a second antenna port using the first TRP. The first and second SSBs may be transmitted using cross-polarized antenna elements, as previously described.

Figure 9:
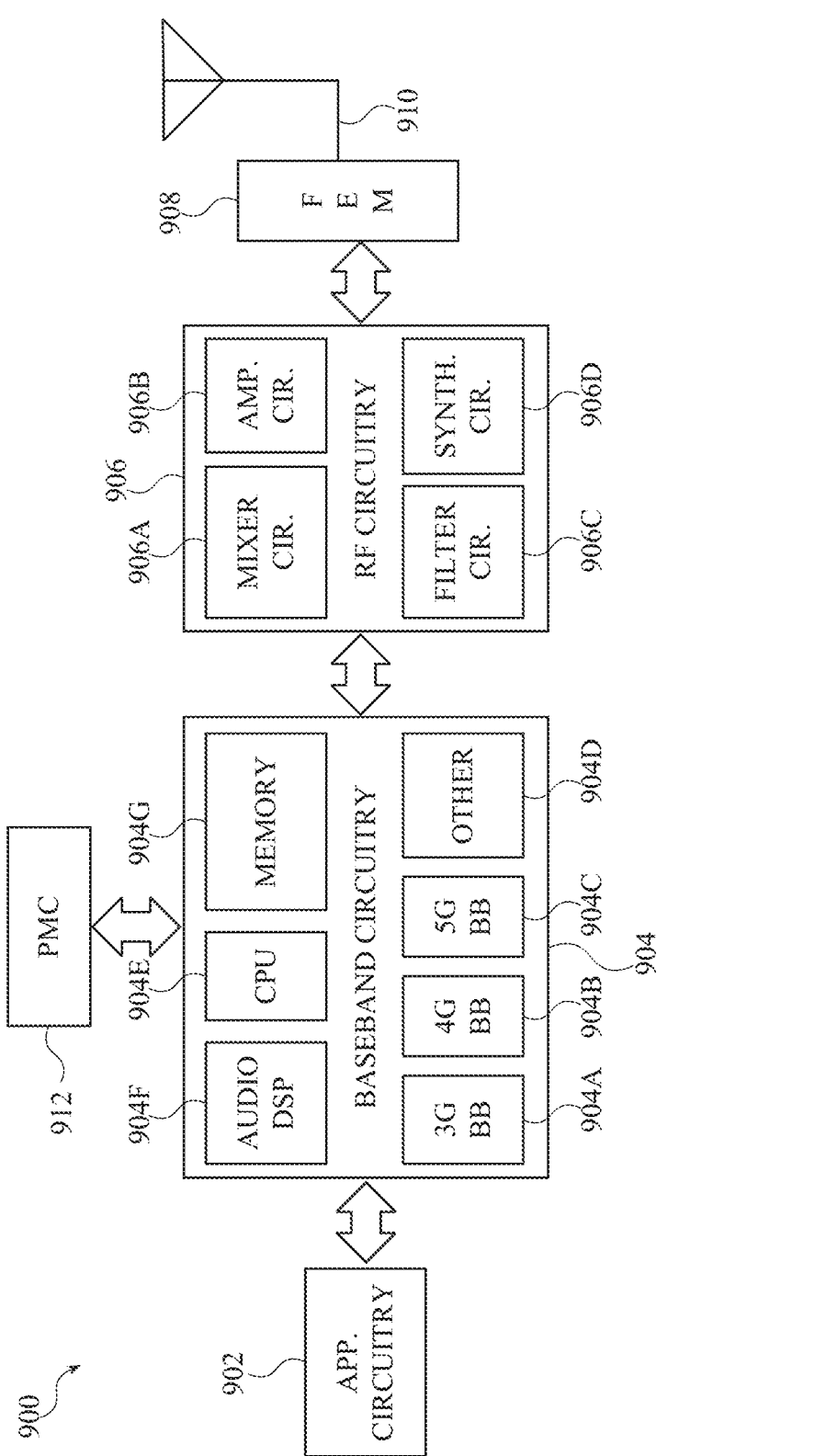
FIG. 9 is a block diagram illustrating a device that can be employed to perform dual port SSB transmission for multiple Rx beam selection in accordance with some aspects of the present disclosure.

FIG. 9 is a diagram illustrating example components of a device 900 that can be employed in accordance with some aspects of the present disclosure. In some aspects, the device 900 can include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 can be included in a UE or a RAN node such as the UE 101 or the base station 111 as described, for example, with reference to FIGS. 1-3 and throughout the present disclosure. The UE 101 and the base station 111 may be configured to utilize dual port SSB for multiple Rx beam selection, as described throughout the present disclosure. In some implementations, the device 900 can include fewer elements (e.g., a RAN node may not utilize application circuitry 902 and instead include a processor/controller to process IP data received from a CN, which may be a 5GC or an Evolved Packet Core (EPC)). In some implementations, the device 900 can include additional elements such as, for example, memory/storage, display, camera, sensor (including one or more temperature sensors, such as a single temperature sensor, a plurality of temperature sensors at different locations in device 900, etc.), or input/output (I/O) interface. In other implementations, the components described below can be included in more than one device (e.g., said circuitries can be separately included in more than one device for Cloud-RAN (C-RAN) implementations).

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 900. In some implementations, processors of application circuitry 902 can process IP data packets received from an EPC.

The baseband circuitry 904 can include circuitry such as, but not limited to, one or more single-core or multi-core processors. The baseband circuitry 904 can include one or more baseband processors or control logic to process baseband signals received from a receive signal path of the RF circuitry 906 and to generate baseband signals for a transmit signal path of the RF circuitry 906. Baseband circuitry 904 can interface with the application circuitry 902 for generation and processing of the baseband signals and for controlling operations of the RF circuitry 906. For example, in some implementations, the baseband circuitry 904 can include a 3G baseband processor 904A, a 4G baseband processor 904B, a 5G baseband processor 904C, or other baseband processor(s) 904D for other existing generations, generations in development or to be developed in the future (e.g., 2G, 6G, etc.).

The baseband circuitry 904 (e.g., one or more of baseband processors 904A-D) can handle various radio control functions that enable communication with one or more radio networks via the RF circuitry 906. In other implementations, some or all of the functionality of baseband processors 904A-D can be included in modules stored in the memory 904G and executed via a Central Processing Unit (CPU) 904E. The radio control functions can include, but are not limited to, signal modulation/demodulation, encoding/decoding, radio frequency shifting, etc. In some implementations, the baseband circuitry 904 can include one or more audio digital signal processor(s) (DSP) 904F.

RF circuitry 906 can enable communication with wireless networks using modulated electromagnetic radiation through a non-solid medium. In various implementations, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some implementations, the receive signal path of the RF circuitry 906 can include mixer circuitry 906A, amplifier circuitry 906B and filter circuitry 906C. In some implementations, the transmit signal path of the RF circuitry 906 can include filter circuitry 906C and mixer circuitry 906A. RF circuitry 906 can also include synthesizer circuitry 906D for synthesizing a frequency for use by the mixer circuitry 906A of the receive signal path and the transmit signal path.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Example 1 is a baseband processor of a user equipment (UE). The baseband processor comprises one or more processors configured to execute instructions stored in a memory to cause the UE to: receive, from a first transmission reception point (TRP), a first synchronization signal block (SSB) with a first polarization and a second SSB with a second polarization different than the first polarization, identify one or more optimal receive (Rx) beams for multiple-input multiple-output (MIMO) communication based on the first SSB and the second SSB, and receive data using the one or more optimal Rx beams.

Example 2 comprises any variation of the example of example 1, wherein the one or more processors further cause the UE to receive the first SSB and the second SSB using a same set of frequency resources.

Example 3 comprises any variation of the example of example 1, wherein the first polarization and the second polarization are approximately orthogonal.

Example 4 comprises any variation of the example of example 1, wherein the one or more processors further cause the UE to: receive, from a second TRP, a third SSB with a third polarization and a fourth SSB with a fourth polarization, wherein the third polarization is different than the fourth polarization, and wherein identifying the one or more optimal Rx beams is further based on the third SSB and the fourth SSB.

Example 5 comprises any variation of the example of example 4, wherein the first TRP and the second TRP are part of a same base station.

Example 6 comprises any variation of the example of example 4, wherein the one or more processors further cause the UE to receive the first, second, third, and fourth SSBs using at least two antenna panels.

Example 7 comprises any variation of the example of example 4, wherein the one or more processors further cause the UE to receive the first, second, third, and fourth SSBs using at least four antenna ports.

Example 8 comprises any variation of the example of example 1, wherein the one or more processors further cause the UE to: determine a channel matrix based on the first SSB and the second SSB, and identify the one or more optimal Rx beams based on the channel matrix using a linear minimum mean square error (LMMSE) criterion.

Example 9 comprises any variation of the example of example 8, wherein the one or more processors further cause the UE to identify the one or more optimal Rx beams from a codebook of Rx beams.

Example 10 is a baseband processor of a base station. The baseband processor comprises one or more processors configured to execute instructions stored in a memory to cause the base station to: transmit a first synchronization signal block (SSB) with a first polarization, and transmit a second SSB with a second polarization, wherein the second polarization is different than the first polarization.

Example 11 comprises any variation of the example of example 10, wherein the one or more processors further cause the base station to transmit the first SSB and the second SSB using a same set of frequency resources.

Example 12 comprises any variation of the example of example 10, wherein the one or more processors further cause the base station to transmit the first and second SSBs using first and second antenna ports respectively.

Example 13 comprises any variation of the example of example 10, wherein the first SSB is transmitted using a first set of antenna elements, wherein the second SSB is transmitted using a second set of antenna elements, and wherein a polarization of the first set of antenna elements is approximately orthogonal to a polarization of the second set of antenna elements.

Example 14 comprises any variation of the example of example 10, wherein the one or more processors further cause the base station to transmit the first SSB and the second SSB using a first transmission reception point (TRP).

Example 15 comprises any variation of the example of example 14, wherein the one or more processors further cause the base station to: transmit a third SSB with a third polarization on a third antenna port using a second TRP, and transmit a fourth SSB with a fourth polarization on a fourth antenna port using the second TRP, wherein the third antenna port is different than the fourth antenna port, and wherein the third polarization is different than the fourth polarization.

Example 16 is a method to be performed by a user equipment (UE). The method comprises: receiving, from a first transmission reception point (TRP), a first synchronization signal block (SSB) with a first polarization and a second SSB with a second polarization different than the first polarization, identifying one or more optimal receive (Rx) beams for multiple-input multiple-output (MIMO) communication based on the first SSB and the second SSB, and receiving data using the one or more optimal Rx beams.

Example 17 comprises any variation of the example of example 16, the method further comprising receiving the first SSB and the second SSB using a same set of frequency resources.

Example 18 comprises any variation of the example of example 16, wherein the first polarization and the second polarization are approximately orthogonal.

Example 19 comprises any variation of the example of example 16, the method further comprising: receiving, from a second TRP, a third SSB with a third polarization and a fourth SSB with a fourth polarization, wherein the third polarization is different than the fourth polarization, and wherein identifying the one or more optimal Rx beams is further based on the third SSB and the fourth SSB.

Example 20 comprises any variation of the example of example 16, the method further comprising: determining a channel matrix based on the first SSB and the second SSB, and identifying the one or more optimal Rx beams based on the channel matrix using a linear minimum mean square error (LMMSE) criterion.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor for a user equipment (UE), the baseband processor configured to, when executing instructions stored in a memory, perform operations comprising:
    receiving, from a first transmission reception point (TRP), a first synchronization signal block (SSB) with a first polarization and a second SSB with a second polarization different than the first polarization;
    receiving, from a second TRP, a third SSB with a third polarization and a fourth SSB with a fourth polarization different than the third polarization;
    identifying one or more optimal receive (Rx) beams for multiple-input multiple-output (MIMO) communication, based on the first SSB, the second SSB, the third SSB, and the fourth SSB; and
    receiving a MIMO transmission using the one or more optimal Rx beams.

2. The baseband processor of claim 1, wherein the operations further comprise receiving the first SSB and the second SSB using a same set of frequency resources.

3. The baseband processor of claim 1, wherein the first polarization and the second polarization are approximately orthogonal.

4. The baseband processor of claim 1, wherein the first TRP and the second TRP are part of a same base station.

5. The baseband processor of claim 1, wherein the operations further comprise receiving the first, second, third, and fourth SSBs using at least two antenna panels.

6. The baseband processor of claim 1, wherein the operations further comprise receiving the first, second, third, and fourth SSBs using at least four antenna ports.

7. The baseband processor of claim 1, wherein the operations further comprise:
    determining a channel matrix based on the first SSB and the second SSB; and identifying the one or more optimal Rx beams based on the channel matrix using a linear minimum mean square error (LMMSE) criterion.

8. The baseband processor of claim 7, wherein the operations further comprise identifying the one or more optimal Rx beams from a codebook of Rx beams.

9. A method for a user equipment (UE), comprising:
    receiving, from a first transmission reception point (TRP), a first synchronization signal block (SSB) with a first polarization and a second SSB with a second polarization different than the first polarization;
    determining a channel matrix based on the first SSB and the second SSB;
    identifying, based on the channel matrix and a linear minimum mean square error (LMMSE) criterion, one or more optimal receive (Rx) beams for multiple-input multiple-output (MIMO) communication; and
    receiving data using the one or more optimal Rx beams.

10. The method of claim 9, further comprising receiving the first SSB and the second SSB using a same set of frequency resources.

11. The method of claim 9, wherein the first polarization and the second polarization are approximately orthogonal.

12. The method of claim 9, further comprising receiving, from a second TRP, a third SSB with a third polarization and a fourth SSB with a fourth polarization, wherein the third polarization is different than the fourth polarization, and wherein identifying the one or more optimal Rx beams is further based on the third SSB and the fourth SSB.

13. The baseband processor of claim 1, wherein the operations further comprise:
    estimating a channel matrix to determine the one or more optimal Rx beams, based on the first SSB, the second SSB, the third SSB, and the fourth SSB.

14. The baseband processor of claim 1, wherein the one or more optimal Rx beams are selected from a beam codebook.

15. The baseband processor of claim 14, wherein the beam codebook comprises M number of entries, and wherein the operations further comprise receiving M number of occasions of each of: the first SSB, the second SSB, the third SSB, and the fourth SSB, in order to identify the one or more optimal Rx beams.

16. A user equipment (UE), comprising:
    radio frequency (RF) circuitry; and
    a processor coupled to the RF circuitry and configured to execute instructions stored in a memory to cause the UE to:
        receive, from a first transmission reception point (TRP), a first synchronization signal block (SSB) with a first polarization and a second SSB with a second polarization different than the first polarization;
        receive, from a second TRP, a third SSB with a third polarization and a fourth SSB with a fourth polarization different than the third polarization;
        identify one or more optimal receive (Rx) beams for multiple-input multiple-output (MIMO) communication, based on the first SSB, the second SSB, the third SSB, and the fourth SSB; and
        receive a MIMO transmission using the one or more optimal Rx beams.

17. The UE of claim 16, wherein the processor further causes the UE to receive the first SSB and the second SSB using a same set of frequency resources.

18. The UE of claim 16, wherein the first polarization and the second polarization are approximately orthogonal.

19. The UE of claim 16, wherein the first TRP and the second TRP are part of a same base station.

20. The UE of claim 16, wherein the processor further causes the UE to receive the first, second, third, and fourth SSBs using at least two antenna panels.

* * * * *